United States Patent Office 2,995,512
Patented Aug. 8, 1961

2,995,512
CLARIFICATION PROCESS
Charles Leslie Weidner and Isaac Richard Dunlap, Cranbury, N.J., assignors, by mesne assignments, to The Dow Chemical Company, Midland, Mich., a corporation of Delaware
No Drawing. Filed Feb. 9, 1951, Ser. No. 210,282
Claims priority, application Canada Feb. 17, 1950
4 Claims. (Cl. 210—54)

This invention relates to methods of precipitating dispersed materials from colloid systems, to products resulting therefrom, and to novel agents for precipitation of colloidally dispersed materials. It is concerned with rapid and economical means for increasing the particle size, and consequently also the bulk heterogeneity of a dispersed system as in concentrating flocculating or coagulating aqueous systems.

An aqueous medium is frequently employed for distributing non fluid bodies advantageously; for example, in the coating of films, spinning of fibers, impregnation of paper or other bibulous materials, lamination of sheets, etc. Fluidity is temporarily conferred on these bodies by entraining them in water for use as may later be desirable. In the preparation of polymers, water dispersions are a well known means of moderating and controlling the reaction. Having thus solved the problem of conferring mobile character to these non fluid bodies by use of dispersion, a new problem is introduced; namely, that of separating the mobilizing medium from the dispersed bodies when the utility of the former has passed. For in many cases, the utility of the dispersed phase depends upon its immobility, inertness, or non-rewettability when deposited.

Several methods are known and widely used in industry for precipitating colloidal dispersions and for coagulation of natural and synthetic colloidal systems. Among such methods are heating, cooling, the use of electrical current, violent agitation and the addition of chemicals. Among the latter, the precipitation of latices, emulsions and other colloidal systems by the addition of salts, especially salts of the alum type and/or the addition of acid to change the pH of the colloidal system are known.

These methods of the prior art have several disadvantages, particularly in certain specialized applications. In the use of such chemical precipitation methods of the prior art a relatively large amount of precipitating agent is required and, whether or not chemicals are added, there is usually substantial contamination of the precipitated product. In many cases the removal of the dispersed phase from the continuous phase of the colloidal system is relatively incomplete. Such removal is particularly inefficient in cases where only a relatively minor amount of dispersed phase, for instance of the order of less than one percent by weight of the system, is present. Moreover, in view of the inefficiency of the processes of the prior art unduly large amounts of materials need to be handled to obtain the desired result. Accordingly, the processing cost is high and many precipitation processes of the prior art are economically unattractive.

In accordance with this invention precipitation in colloidal systems is accomplished by addition to the colloidal system of minute amounts (i.e. from about one part per million to about one percent by weight of the colloidal system it is desired to coagulate) of certain water-soluble polymeric materials which contain at least three groups capable of substantial ionization in water, referred to herein as multiple charged units, and which furnish ions carrying a charge opposed to the charge on the particles of the dispersed phase of the colloidal system.

The invention broadly has two distinct aspects, namely, (1) the use of water-soluble cationic polymers to precipitate anionic disperse phases, and (2) the use of water-soluble anionic polymers to precipitate cationic disperse phases.

Cationic polymers are defined herein as organic substances having recurring ionizable groups in which the cations are chemically linked, whereas the anions are freely mobile except as they may be hindered by electrostatic charges. Anionic dispersed phases are the dispersed bodies carrying an absorbed or relatively immobile anion, such as fatty acid anion, or other organic carboxylic sulfonic or organic anion, while the cation is believed to be relatively mobile in the surrounding hydrophilic layer.

Anionic polymers and cationic disperse phases refers to the opposite condition when the recurring unit in the polymer is a chemically linked anion and the cation is an independent unit, or where the dispersed phase carries an absorbed and relatively immobile cation such as a rosin amine salt. The multiple charged units of the precipitating agent and the dispersed bodies are attracted to opposite poles of an anode-cathode system in aqueous medium.

The expression "groups capable of substantial ionization" is intended in the cationic field to include among others, the substituted ammonium salts, i.e., including one or more of the characteristic groups primary, secondary (including imines) and tertiary amines and the quaternary ammonium salts and comprising at least three ionizable groups of salts per molecular unit and the application of polymeric materials of this type:

(1) Permits use of less precipitating agent than in the prior art, particularly if the dispersed phase comprises only a very minor proportion of the colloidal system;

(2) Causes considerably less contamination of the end product than use of precipitating agents or methods of the prior art (thus less washing is required to reach a given level of contamination, and often a less contaminated end product results than can be obtained from the same system with any degree of washing, were the conventional precipitating agents used);

(3) Permits in some systems, more nearly complete removal of the dispersed phase than is possible by methods known prior to this invention;

(4) Lowers costs and particularly processing costs under comparative costs of the use of prior art precipitating agents and methods.

The first aspect is at the present time of much greater importance commercially than the second aspect as the number and commercial importance of anionic dispersions greatly outweigh the number and commercial importance of cationic dispersions. In this first aspect of the invention a large number of different materials have been tested and found satisfactory.

PRECIPITATION OF ANIONIC DISPERSE PHASES

Types of precipitating agents useful for coagulation of disperse anionic phases are: (1) the water soluble quaternary ammonium salt resulting from the reaction between polyvinyl pyridine (which may be copolymerized with other materials such as styrene) and butyl bromide. This reaction may be carried out as described by Fuoss, J. Poly. Sci. 3, 246–63 (1948): (2) the water soluble quaternary ammonium salts resulting from the reaction of a primary diamine such as propylene diamine, an alkyl halide such as 1-, 4-dichlorbutane, and a halogenated alkyl compound such as butyl bromide; reacted under conditions unfavorable to ring formation: (3) salts of polyvinylamine, such as the acetate: (4) the water soluble formaldehyde reaction product of guanidine carbonate, or of certain substituted guanidine salts such as aminoguanidine carbonate: (5) salts of polyethylene imine, such as the acetate or sulfate: (6) salts of long chain polymeric secondary amines such as are formed by the reaction of 1-, 4-dibromobutane and 1-6 hexamethylene diamine; and (7) salts such as the chloride or acetate of mixed primary and secondary amines such as triethylene-tetramine or tetraethylene-pentamine.

Although the broad embodiment of our invention consists of the use, as a precipitant, of water soluble organic compounds furnishing a multiplicity of chemically linked ions of a charge opposite that carried by the particles of the dispersed colloidal phase which it is desired to coagulate, efficient precipitation of cationic latices with at least one type cationic polymer of the preferred type has been found to be practical.

PRECIPITATION OF CATIONIC DISPERSE PHASES

Water soluble polymeric anionic materials, which are of importance in the second aspect of this invention exhibit a reaction with cationic latices which is substantially equivalent to the reaction of the compounds mentioned immediately above with anionic latices. Examples of anionic polymers which have the required characteristics of water solubility are: (1) water soluble acrylic and methacrylic acid polymers (these are especially active in precipitation when part of the carboxyl groups therein are neutralized); (2) the water soluble copolymers of maleic anhydride and styrene, usually in substantially equimolar proportions, when hydrolized and partially neutralized to provide a neutral copolymer; (3) the water soluble copolymers of itaconic acid and/or crotonic acid with styrene and/or vinyl acetate, acrylic or methacrylic acid such as the copolymers formed from equimolar ratios of acrylic acid and vinyl acetate which may be prepared as outlined in Trommsdorff Patent 2,326,078, issued August 3, 1946, in the United States. All of these may be used in the manner shown in the example, using a typical product of this type.

NEW PRECIPITATING AGENT

For coagulation of anionic latices our preferred precipitating agent is a water soluble condensation product made by the reaction between guanidine carbonate and formaldehyde in the range of about 1.2 mols of formaldehyde to one mol of guanidine carbonate. Such materials and their equivalents in neutral water soluble form are believed to be new in the art and form one of the novel aspects of the invention. The approximate equivalency of other ratios of formaldehyde to guanidine compound, provided that the polymer is approximately neutral and water soluble, is obvious as is the equivalency of aldehydes other than formaldehyde which provide water soluble polymers of the type described and of compounds similar in chemical structure to guanidine.

Among the substituted guanidine compounds and compounds of similar chemical nature are: phenyl guanidine acetate, guanylurea phosphate, biuret, the phenyl-biguanide mercaptobenzothiazole salt, amino guanidine, and salts of water soluble reaction products of urea, phenol or their homologues and similar compounds mixed with guanidine compounds and reacted with formaldehyde.

Preference for guanidine carbonate-formaldehyde polymers of the type described immediately above is based on cost and availability of reagents and on the general utility, stability and ease of preparation of the desired reaction products.

It has been found that certain of these substituted guanidine compounds, and other similar compounds, vary in desirable precipitating power for latices made with specific dispersing agents and may vary in precipitating power for the same latex with a variation in solids. This phenomenon will be illustrated in subsequent examples.

Effective precipitating agents are, the neutral salts of polyethylene amines. The preferred salts among this class are those formed from nitrogen bases containing at least two amine groups. Thus we have found that progressively increasing effectiveness is obtained in the acetate salts of ethylene diamine, triethylene tetramine, and tetraethylene pentamine while the corresponding monoethyl amine salt is ineffective.

While the chemical reaction mechanism on which the utility of the invention depends is not fully understood, the following explanation may be offered by way of clarification and not as a limiting of the scope of the invention in any way.

Our preferred and most useful precipitating agent probably consists of a long chain molecule carrying a multiplicity of basic nitrogen groups. The established chemical technology of the product obtained by the reaction of guanidine salts with formaldehyde would indicate that such a product, comparatively free from cross linkages between chains, would be especially likely to be formed under the reaction conditions which we have found most favorable and significant utility in carrying out our invention has been found in chemical compounds of known structure of this type, i.e. polyvinyl amine, polyvinyl pyridinium N-butyl bromide.

Such a material would have the effect, when in solution in a colloid system, of a high concentration of charges in the regions adjacent to the dissolved polymer molecule, thus altering, by the changes on its ions, the balanced distribution of electrostatic charges on which the stability of a colloidal dispersion depends and permitting coalescing of particles to begin.

In support of this hypothesis, an acid latex (pH 6.3) was precipitated by means of our preferred cationic precipitating agent; thus the ions furnished by our polymeric electrolyte need not be opposed to the charge carried by the particles of the dispersed phase it is desired to precipitate, for such precipitation to take place, if sufficient change in the charge carried by the particles can be brought about.

USES OF THE INVENTION

In addition to the use of these precipitating agents in coagulating commercial rubber latex and in water treatment and purification there are a wide variety of applications in which better coagulating agents have great utility. For example, in the manufacture and recovery of petroleum products it is well known that the formation of intractable emulsions causes great expense and difficulty. Use of our precipitating agents makes possible the breaking of these emulsions and speeds up the separation of oil and water phases without expensive equipment or long settling times. The formation of oil emulsion in fuels has been an expensive nuisance in oil-fired power plants for ships.

Necessity for the breaking of emulsions occurs commonly in the manufacture of chemicals which must be washed to remove impurities. The use of precipitating agents is necessary at times to the application of emulsions to fabrics, paper and textiles.

Complicated and elaborate equipment for settling of pigment dispersions is commonplace in the recovery and refining of ores, clays and other solid materials. In the examples listed below it will be shown that the settling of such dispersions can be aided materially by the use of our precipitating agents.

To illustrate representative embodiments of the invention by way of example only but not to limit the scope of the invention in any way, several examples of preferred embodiments thereof are shown. The proportions in all of these examples are furnished as parts by weight.

Example I

The neutral water soluble reaction product of phenyl guanidine stearate and formaldehyde is very effective as a coagulant for commercial butadiene acrylonitrile copolymer (for instance in the ratio of sixty percent by weight of butadiene to forty percent by weight of acrylonitrile latices dispersed by means of commercial soap and wherein the solids content was relatively low, in the range of five hundredths of a percent; but the precipitating power for the same latex was not unusual at solids contents near forty percent.

When to fifty cubic centimeters of the above described latex comprising five hundredths of one percent by weight dispersed rubbery copolymer there was added two cubic centimeters of solution comprising three percent of the neutral water soluble reaction product of phenyl guanidine stearate and formaldehyde reacted at a molar ratio of one of the former to 1.2 of the latter, precipitation was readily accomplished by gentle stirring. But more than ten cubic centimeters of the above precipitating solution was required to coagulate fifty cubic centimeters of the same dispersion comprising thirty-nine percent dispersed rubbery copolymer.

Example II

To one hundred parts of an emulsion polymerized ethyl acrylate polymer dispersion comprising thirty percent ethyl acrylate polymer, two percent rosin soap and one-half percent polyvinyl alcohol, was added one part of an aqueous solution containing thirty percent of a polymeric condensation product of guanidine carbonate and formaldehyde in the molar ratio of one of the former to 1.2 of the latter. Using this process and precipitation agent, coagulation of the acrylate dispersion was accomplished readily by gentle agitation.

Example III

To two hundred parts of a latex comprising 28.4 percent of a copolymer comprising 7.4 percent butadiene and 28.6 percent styrene, emulsion polymerized in the presence of about six percent soap, there was added one part of an aqueous solution comprising forty percent by weight of the condensation product described in Example I.

Precipitation was brought about by gentle agitation sufficient to mix the coagulant thoroughly with the latex. The resulting precipitated dry rubber contained one percent of fatty acids while the precipitation of the same latex using sodium chloride and one percent sulphuric acid to a pH of about 3.5 produced a dry rubber comprising five percent of fatty acids after comparable washing.

APPLICATION OF THE INVENTION TO WATER CLARIFICATION

Another embodiment of the invention involves a means of accelerating the settling of inorganic materials which are held in suspension by synthetic detergents. This problem is becoming increasingly serious as the use of synthetic detergents becomes more widespread. Raw water supplies are often clarified by alum treatment and, if the source of water is contaminated with synthetic detergents the floc resulting from alum treatment is slow to settle and difficult to filter. A recent publication estimates this contamination as from one to two parts per million in one fairly typical source of raw water.

In order to show the advantage to be gained by the use of our precipitating agent in this application a suspension of inorganic solids peptized with a typical synthetic detergent was treated as described below:

Example IV

From about one to about ten parts per million of the guanidine carbonate formaldehyde condensation polymer was added to an intimate mixture made up of tap water containing approximately ten parts per million of titanium dioxide, sufficient alum to adjust the hydrogen ion concentration to a pH of approximately 5.7 and of two parts per million of a sulfated surface-active agent of the chemical formula $C_4H_9CH(C_2H_5)$

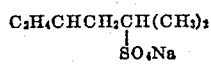

This decreased the settling time of the suspended material by at least forty per cent compared to a control sample free of the guanidine compound.

APPLICATION OF THE INVENTION TO A CATIONIC LATEX

Example V

To one hundred parts of a latex containing 3.99 percent solid copolymer of seventy-five percent butadiene and twenty-five percent acrylonitrile (having a Mooney value of about 45) dispersed in an aqueous acid medium by means of acetyl dimethyl benzyl ammonium chloride dispersing agent was added twenty parts of a two-hundredths of one percent aqueous solution of polyacrylic acid, partially neutralized by sodium hydroxide. Precipitation was rapid and complete.

PRECIPITATION OF DISPERSIONS FREE OF DISPERSING AGENTS

Example VI

A dispersion, identical in all respects with the dispersion described in Example V, except for the omission of the dispersing agent was prepared using the dispersing powers of the acrylonitrile for dispersion of the polymer. To one hundred parts of this dispersion was added one part of a four-tenths of one percent solution of guanidine carbonate formaldehyde as described earlier in this application. Precipitation was readily accomplished by gently stirring of the precipitating agent into the latex.

Example VII

Results similar to the results of Example VI were obtained by the addition of one percent aqueous solutions of polyethylene imine hydrochloride to the above described latex, except that approximately twice the weight of imine salt was required for one hundred parts of latex as compared with the guanidine carbonate formaldehyde for the same latex.

The following examples illustrate the use of the precipitating agents and methods of the invention to precipitate dispersions using miscellaneous dispersing agents other than those shown earlier.

Example VIII

One hundred parts of a latex containing approximately ten percent of a copolymer of 71.5 percent butadiene and 28.5 percent styrene having a Mooney value of fifty was used which was dispersed by means of five parts per one hundred parts of dispersed solids of pentaerythritol monolaurate. To this was added three parts of an aqueous solution comprising forty percent of the previously described guanidine carbonate formaldehyde condensation product. Precipitation was accomplished readily by gentle agitation.

Example IX 2.4 parts of polyethylene imine hydrochloride in aqueous solution was added to one hundred parts of the latex of Example VIII. The precipitating agent was stirred gently into the latex and allowed to stand at room temperature. Coagulation took place within a few minutes.

USE OF THE INVENTION IN CONNECTION WITH NON-RUBBER DISPERSIONS

Example X

To one hundred parts of an aqueous dispersion of polystyrene, containing approximately three percent of the polymer in the dispersed phase and slightly less than three hundredths of a percent of the sodium salt of a sulfated long chain alcohol as dispersing agent, was added one part of an aqueous solution comprising thirty percent guanidine carbonate formaldehyde condensation product. Coagulation was accomplished promptly by gentle blending of the precipitating agent with the system.

Example XI

Coagulation of the latex of Example X could also be accomplished by the addition to one hundred parts of the latex of three parts of polyvinyl N-butyl pyridinium bromide as water solution comprising three tenths of one percent polymer solids.

Example XII

Using twice the amount of polyvinylamine hydrochloride to substitute for the guanidine carbonate formaldehyde, coagulation of the polystyrene latex of Example X was readily accomplished.

Example XIII

To one hundred parts by weight of a commercial latex containing approximately six percent by weight of a copolymer of ninety parts vinyl chloride and ten parts vinylidene chloride, dispersed by means of five parts of commercial soap, was added two parts of an aqueous solution comprising thirty percent guanidine carbonate formaldehyde condensation polymer as described previously. Precipitation was rapid and complete.

Example XIV

One hundred parts of an aqueous colloidal dispersion of silicon dioxide containing about ten percent by weight of dispersed solids was prepared free of organic dispersing agent, by adjusting the hydrogen ion concentration by means of sodium hydroxide to a pH of about ten. To this dispersion was added one-half of one percent of an aqueous solution comprising three percent guanidine carbonate formaldehyde condensation polymer. On sufficient agitation to mix the precipitant with the colloidal suspension, precipitation was accomplished.

Example XV

One hundred parts of a dispersion identical to the dispersion of Example XIII was precipitated using two parts of an aqueous solution comprising twenty-five percent neutral polyethylene imine hydrochloride. Precipitation was accomplished in approximately twice the time required to precipitate the identical dispersion by means of guanidine carbonate formaldehyde.

While the above examples illustrate various methods of accomplishing precipitation in accordance with the invention, a typical example of the preparation of a preferred guanidine carbonate formaldehyde precipitating agent of the invention is illustrated in the following example.

PREPARATION AND EVALUATION OF PREFERRED PRECIPITATING AGENTS

Example XVI

One hundred and twenty-one grams commercial guanidine carbonate and one hundred grams commercial thirty-seven percent formaldehyde were mixed and heated, with occasional stiring, on an electric hot plate.

The initial hydrogen ion concentration of the mixture was equivalent to a pH of about 8.5. At the end of four hours of heating, the reaction vessel contained a viscous (when hot) transparent mass and the hydrogen ion concentration had fallen to a pH of about 7.5. Water was added and stirred to dissolve the reaction product. All during the heating, there was evolution of carbon dioxide from the reaction, and it was to facilitate the escape of this material that water was added. After additional heating at the boiling point of the solution for one and one-half hours, the pH was about 7.2 as measured with pH paper, and heating was discontinued.

The product obtained was an almost colorless solution containing thirty-seven percent solids. The viscosity of this thirty-seven percent solution was not substantially greater than that of water. The dry reaction product was a transparent, very slightly colored, solid, having a softening point below eight degrees centigrade.

Heating of the reaction mixture more strongly than was done in the above example by allowing substantially all the water to evaporate from the reaction components yields a light yellow, somewhat brittle solid with a softening point above one hundred degrees centigrade. Heating the reactants in the above proportions on a steam plate yielded, upon heating for about ten hours, a product having a softening point below room temperature which was colorless and transparent.

The reaction products obtained in the examples given above were substantially equivalent in precipitating power when used as described in this disclosure; yet, neither guanidine carbonate nor formaldehyde alone or in combination in an unreacted condition have significant precipitating action unless used or added in concentrations much greater than is required for their reaction product as described above.

The product we desire to use is a water-soluble condensation polymer of guanidine and/or its carbonate and formaldehyde. The above examples are based on the use of commercial materials, and some variation may be expected due to slight differences in materials or reaction conditions. The above is given by way of example only since an equivalent product might be obtained with somewhat different ratios of reactants by control of reaction conditions.

In formation of one of our preferred precipitating agents, guanidine carbonate may be mixed with urea, in molar ratios of from about one mol of guanidine salt to about one and one-third mols of urea, and the resulting mixture reacted with formaldehyde at steam bath temperature until clear to form a product useful in the practice of this invention. Even high ratios of urea to guanidine salt may be used if sufficient control of reaction conditions is used to yield a product soluble in water on dilution to low solids.

Similarly to the above, but at lower ratios, thiourea may be employed as a co-reactant with the guanidine salt. However, if more than one mol of thiourea per two and one-half mols of guanidine salt is used, difficulty in obtaining a water-soluble product after resinification is encountered.

Similarly, phenol, p-cresol and m-cresol or mixtures of meta and para cresol may be employed as a co-reactant with the guanidine salt at molar ratios which will yield soluble products when reacted with formaldehyde.

The solubility of the resinous reaction product of the above described mixtures need not be great for coagulation of dilute latices.

Example XVII

The following tables show the increased effectiveness as the chain length increases in an amine salt and the gain in effectiveness of an amine salt over the amine as tested against a latex comprising a copolymer of butadiene sixty percent and acrylonitrile forty percent dispersed with a commercial soap and against at latex comprising a copolymer of fifty percent butadiene, fifty percent styrene having a Mooney value of approximately fifty-five and dispersed by means of potassium fatty acid soap. The precipitating powers of the materials were tested by the addition of aqueous solutions comprising ten percent of the amine and of the amine salts as indicated in the tables.

In the following tables, A indicates the acrylonitrile copolymer, B the styrene copolymer in a latex comprising twenty percent solids rubbery copolymer. The addition of a prime mark (') to the letter indicates the latex at two tenths of one percent solids.

The precipitants listed were added from an aqueous solution comprising ten per cent solids. The amounts listed are in cubic centimeters required to precipitate ten cubic centimeter portions of the latices. For purposes of comparison with an inorganic material an aqueous solution comprising ten percent sodium chloride was used.

TABLE I

| Precipitants | Cc. required to precipitate A | Cc. required to precipitate A' | Cc. required to precipitate B | Cc. required to precipitate B' |
|---|---|---|---|---|
| Ten percent sodium chloride | 10 | 5 | 10 | 5 |
| Ethylene diamine | 10 | 5 | 10 | 5 |
| Ethylene diamine acetate | 2.2 | 1.2 | 2.4 | 1.0 |
| Triethylene tetramine | 10 | 5 | 10 | 5 |
| Triethylene tetramine acetate | 1.3 | 0.6 | 1.2 | 0.5 |
| Tetraethylene pentamine [1] | 10 | 5 | 10 | 5 |
| Tetraethylene pentamine acetate | 1.1 | 0.15 | 1.0 | 0.1 |

[1] Representative of the type product obtained by the reaction of at least one primary diamine, at least one alkyl dihalide and at least one non-halogenated alkyl hydrocarbon.

The following examples are shown as illustrations of the effect of heating on the guanidine carbonate formaldehyde mixture which comprises one of our preferred precipitating agents.

*Example XVIII*

In the previous section of this specification the effect of increase in chain length of condensed ethylene diamines is shown to increase the effectiveness of the precipitating action. A similar increase in precipitating power with degree of condensation is shown in the table below.

The following table shows A, A', B, B' as given in the data regarding precipitating action of condensed ethylene diamines. The precipitant was made up by mixing guanidine carbonate and formaldehyde in the molar ratios of one mol of guanidine carbonate to one and two tenths mols of formaldehyde and diluting the resultant material to ten percent reactive solids with water.

| Guanidine carbonate plus formaldehyde, ten percent aqueous solution | Cc. required to precipitate 10 cc. A | Cc. required to precipitate 10 cc. A' | Cc. required to precipitate 10 cc. B | Cc. required to precipitate 10 cc. B' |
|---|---|---|---|---|
| Freshly made | 10 | 2.4 | 1.9 | 5 |
| After heating for fifteen minutes on a steam bath | 3.3 | 0.3 | 1.5 | 0.3 |
| After heating for thirty minutes on a steam bath | 2.1 | 0.5 | 1.8 | 0.3 |
| After heating for forty-five minutes on a steam bath | 1.7 | 0.4 | 1.1 | 0.2 |
| After standing over night at room temperature | 3.5 | 0.3 | 1.5 | 0.4 |

*Example XIX*

Similarly, when one hundred and three parts of biuret was heated for four and one-half hours on a steam bath with one hundred parts of commercial thirty-seven percent formaldehyde a resinous, clear colorless, water-soluble material having a melting point substantially below eighty degrees centigrade was obtained.

*Example XX*

To one hundred parts of the latex described in Example I was added ten parts of a water solution comprising five per cent of the above described reaction product. Precipitation took place in a few minutes after gentle agitation to mix the precipitant with the latex.

However, the above described reaction product of biuret and formaldehyde had much less effect in precipitating this latex at low solids contents, near five tenths of one percent, than a comparable quantity of our preferred precipitating agent guanidine carbonate formaldehyde.

*Example XXI*

Amino guanidine-formaldehyde was prepared by heating one hundred thirty-six parts amino guanidine bicarbonate and one hundred parts commercial, thirty-seven percent, formaldehyde on a steam bath for approximately four hours. The resulting product was a water white viscous mass having a pH of about seven and two tenths as measured by colorimetric methods in sixty percent aqueous solution.

*Example XXII*

To one hundred parts of the latex described in Example IV was added ten parts of the above polymeric aminoguanidine formaldehyde product in water solution comprising about nineteen one-hundredths percent solids.

Precipitation was rapid and complete upon gentle stirring of the polymer solution to the latex.

*Example XXIII*

Cellulose methyl ether amide was prepared by heating the ammonium salt of carboxymethyl cellulose in a circulating air oven overnight at one hundred and twenty degrees centigrade. This product, a light brown powdery mass insoluble in water, toluene, or petroleum ether, was suspended in water containing sodium hydroxide and treated at steam bath temperature with bromine to form the amine.

After two hours of such treatment the material had substantially all dissolved and the contents of the reaction vessel was neutralized with dilute hydrochloric acid, dialyzed to remove salts, and filtered to remove a small amount of unreacted material.

The filtrate was a slightly colored solution which when concentrated by slow evaporation became very viscous.

*Example XXIV*

To one hundred parts of the latex described in Example III was added two parts of the above described carboxymethyl cellulose product as a water solution comprising twenty percent concentration.

Coagulation was accomplished by sufficient agitation to mix the reactant with the latex.

USE OF A MIXED RESIN PRECIPITATING AGENT

*Example XXV*

To one hundred gram portions of the latex described in Example I comprising five one-hundredths of one percent solids was added two one-hundredths of one gram of the mixed resin formed from the reaction of guanidine carbonate and (a) urea, (b) thiourea in molar ratios of from one mol of guanidine carbonate to two mols of the urea to two mols of guanadine carbonate to one mol of urea. These resins effectively coagulated the latex. Thiourea behaved in a similar manner except that the reaction product was insoluble in dilute solution when the molar ratio of thiourea exceeded that of guanidine carbonate.

CONCLUSION

The invention is equally applicable to the many industrial uses of precipitation, for instance, in the separation of sludges, precipitation of colloidal dispersions of all types and of other commercial dispersions. The invention has been described with reference to its preferred embodiments although many modifications thereof are included within its spirit. The invention therefore is limited only by the prior art.

We claim:

1. The method of clarifying a liquid suspension of solids suspended in an aqueous phase comprising the steps of adding to said suspension, under flocculating conditions, a polymer selected from the group consisting of polyethyleneimines and water soluble polyelectrolyte resins containing a plurality of radicals in which quaternary ammonium nitrogen is present, said resin having a structure derived by a method comprising polymerization of at least one monoolefinic compound through the aliphatic unsaturated group, in an amount sufficient to flocculate and agglomerate said suspended solids, and separating the flocculated and agglomerated solids from the aqueous liquid.

2. A process as defined in claim 1 in which the cationic polymer comprises a water-soluble salt of polyethylene imine.

3. The method of clarifying a liquid suspension of solids suspended in an aqueous phase comprising the steps of adding to said suspension, under flocculating conditions, a water soluble polyelectrolyte resin containing a plurality of radicals in which quaternary ammonium nitrogen is present and having a structure derived by a method comprising polymerization of at least one mono-olefinic compound through the aliphatic unsaturated group, in an amount sufficient to flocculate and agglomerate said suspended solids, and separating the flocculated and agglomerated solids from the aqueous liquid.

4. A process as defined in claim 3 in which the cationic polymer comprises the water-soluble quaternary ammonium salt that is the reaction product between a vinyl pyridine polymer and alkyl halide.

References Cited in the file of this patent

UNITED STATES PATENTS

| | | |
|---|---|---|
| 2,104,728 | Bertsch et al. | Jan. 11, 1938 |
| 2,221,018 | Backman et al. | Nov. 12, 1940 |
| 2,236,545 | Maxwell et al. | Apr. 1, 1941 |
| 2,236,930 | Uytenbogaart | Apr. 1, 1941 |
| 2,327,302 | Dittmer | Aug. 17, 1943 |
| 2,347,576 | Ogilby | Apr. 25, 1944 |
| 2,442,768 | Gunderson | June 8, 1948 |
| 2,552,775 | Fischer et al. | May 15, 1951 |
| 2,563,897 | Wilson et al. | Aug. 14, 1951 |
| 2,582,840 | Maxwell | Jan. 15, 1952 |
| 2,601,598 | Daniel et al. | June 24, 1952 |
| 2,607,721 | Holman | Aug. 19, 1952 |
| 2,626,213 | Novak | Jan. 20, 1953 |

FOREIGN PATENTS

| | | |
|---|---|---|
| 811,938 | France | Jan. 27, 1937 |

OTHER REFERENCES

Michaels et al.: Ind. & Eng. Chem., vol. 46, No. 7, July 1954, pages 1485–90.